(12) United States Patent
Streng

(10) Patent No.: US 9,683,793 B2
(45) Date of Patent: Jun. 20, 2017

(54) LIQUID DISTRIBUTION DEVICE

(71) Applicant: CTS Cooling Tower Solutions GmbH, Düsseldorf (DE)

(72) Inventor: Andreas Streng, Düsseldorf (DE)

(73) Assignee: CTS Cooling Tower Solutions GmbH, Düsseldorf (DE)

( * ) Notice: Subject to any disclaimer, the term of this patent is extended or adjusted under 35 U.S.C. 154(b) by 75 days.

(21) Appl. No.: 14/686,880

(22) Filed: Apr. 15, 2015

(65) Prior Publication Data

US 2015/0292823 A1    Oct. 15, 2015

(30) Foreign Application Priority Data

Apr. 15, 2014   (DE) .................... 20 2014 101 774 U

(51) Int. Cl.
| | |
|---|---|
| *B01F 3/04* | (2006.01) |
| *F28F 25/00* | (2006.01) |
| *F28F 25/06* | (2006.01) |
| *F28F 21/06* | (2006.01) |
| *F28C 1/00* | (2006.01) |
| *F28C 1/16* | (2006.01) |

(52) U.S. Cl.
CPC .......... *F28F 25/06* (2013.01); *B01F 3/04049* (2013.01); *B01F 3/04078* (2013.01); *F28C 1/00* (2013.01); *F28C 1/16* (2013.01); *F28F 21/06* (2013.01)

(58) Field of Classification Search
CPC .... B01F 3/04; B01F 3/04007; B01F 3/04021; B01F 3/04049; B01F 3/04078; F28F 25/02; F28F 25/06; B05B 15/06

USPC .................. 261/23.1, 117, DIG. 11; 239/279
See application file for complete search history.

(56) References Cited

U.S. PATENT DOCUMENTS

| | | | |
|---|---|---|---|
| 4,543,218 A | 9/1985 | Bardo et al. | |
| 5,848,606 A * | 12/1998 | Zimmer ................. | B41F 15/40 137/561 A |
| 8,387,897 B2 * | 3/2013 | Bevilacqua ............... | B05B 1/20 239/279 |
| 2011/0210456 A1 | 9/2011 | Boyd | |

FOREIGN PATENT DOCUMENTS

| | | |
|---|---|---|
| CN | 201 032 408 Y | 3/2008 |
| EP | 0 168 525 | 1/1986 |
| EP | 2 304 372 B1 | 4/2011 |
| JP | S47-34944 | 10/1972 |
| JP | H11 83 385 A | 3/1999 |

* cited by examiner

*Primary Examiner* — Robert A Hopkins
(74) *Attorney, Agent, or Firm* — Gudrun E. Huckett

(57) ABSTRACT

A liquid distribution device for fluid cooling devices particularly for cooling towers comprises at least one primary distribution pipe or at least one primary distribution trough, wherein a plurality of secondary distribution pipes are connected to the at least one primary distribution pipe or the at least one primary distribution trough, wherein the secondary distribution pipes are provided with nozzles, wherein the secondary distribution pipes at least section-wise have an angular cross-section and are formed from a fiber reinforced plastic.

10 Claims, 8 Drawing Sheets

LIQUID DISTRIBUTION DEVICE

BACKGROUND OF THE INVENTION

The invention concerns a liquid distribution device for fluid cooling devices particularly for cooling towers, comprising at least one primary distribution pipe or at least one primary distribution trough, wherein a plurality of secondary distribution pipes are connected to the at least one primary distribution pipe or the at least one primary distribution trough, wherein the secondary distribution pipes are furnished with nozzles. Moreover, the invention concerns a fluid cooling device particularly for cooling towers comprising a liquid distribution device according to the invention.

Cooling towers and also liquid distribution devices for cooling towers are known in general from the prior art so that separate supporting documentation by printed publications is not required here.

In fluid cooling devices, generally a liquid is guided past a gas for the purpose of energy transfer. In this context, cooling action is either intended for the liquid or for the gas wherein always a partial quantity of the liquid also evaporates but also condenses again. Conversely, heating of one of the two fluids that are guided past each other may be intended with principally the same configuration of the fluid cooling device. This is then a fluid heating device. In order to be able to achieve in any case an energy transfer as good as possible between the two fluids, a liquid cooling device is always provided by means of which the liquid is distributed as uniformly as possible across the cross-section of the apparatus, i.e., the cooling tower. In case the liquid is not evaporated or vaporized completely within the device, the remaining liquid can be collected in a suitable catching device.

Cooling towers serve for cooling a fluid, for example, a liquid. Often, the fluid to be cooled is water. However, acid cooling towers are also in use, i.e., an acid is cooled in the cooling tower by means of ambient air, also in accordance with the principle of evaporative cooling. However, other liquids or gases can be cooled also within the cooling tower, for example, air for the purpose of air conditioning of rooms.

All of these fluid cooling devices comprise a liquid distribution device for uniform spraying of the liquid to be cooled, as disclosed particularly in EP 2 304 372 B1. The liquid distribution device described therein comprises a plurality of distribution pipes which are connected to at least one common infeed pipe at the liquid side. The pipes all have a round cross-section wherein in this context the distribution pipes each are connected by means of one of their two ends in longitudinal direction with the infeed pipe by means of cutouts in the sidewall of the infeed pipe.

A liquid distribution device of the aforementioned kind is moreover disclosed in US 2011/0210456 A1. It comprises a primary distribution pipe to which are connected secondary distribution pipes provided with nozzles. The primary distribution pipe is arranged within a carrier, the carrier having a substantially rectangular configuration. The secondary distribution pipes with a circular cross-section are suspended from a support construction and are not connected directly to the primary distribution pipe but with intermediate connection of a respective connecting socket to the primary distribution pipe.

EP 0 168 525 A2 discloses also a liquid distribution device of the aforementioned kind. It comprises primary distribution pipes as well as secondary distribution pipes furnished with nozzles. In this context, the primary distribution pipes as well as the secondary distribution pipes are embodied with a circular cross-section and can be formed of a glass fiber reinforced plastic.

Even though in particular round pipe cross-sections have proven valuable in practice as a result of their excellent flow properties, strength properties, and manufacturing properties, there is a need for improvement in regard to various aspects.

In general, pipes of weight-saving plastic materials such as polyvinyl chloride (PVC), polypropylene (PP), glass fiber reinforced plastic (GRP), and polyethylene (PE) are used for easier assembly and for avoiding corrosion damage. When these lightweight pipes are filled with water in operation, these pipes have the tendency to sag, in particular at higher temperatures of e.g. up to 60° (maximum limitation of use of PVC). In case of emptying, the water can no longer drain and freezes at freezing temperatures and the pipes can break in the worst case. Indeed, with the material selection GRP, PP or others the maximum temperature of use can still be increased. The material GRP has also generally higher strength properties so that one can counteract said problem of sagging. However, manufacture of pipes from these materials, in particular from GRP, is very complex which, as a consequence, leads to uneconomical production costs of such pipes.

Since round pipes are resting only with linear contact on the load-bearing beams, the problem of stability is even more exacerbated. As a result, relatively tight support spacings of the load-bearing beams of the cooling tower must be selected in order to avoid sagging and the resulting damages. This increases in a disadvantageous way the construction expenditure of the liquid distribution device and leads thus to a cost increase of the entire construction.

In practice, it has become accepted practice to install the drift eliminators of a cooling tower, which are preferably designed as baffle separators, transversely across the round pipes of the water distribution piping. The individual baffles, assembled to arrays of the drift eliminator, are resting however only with point contact on the round pipes. Since for material saving reasons, relatively thin baffles of PVC, PP etc. are employed, the baffles over time will sag in this context and are damaged until they can no longer fulfill their function anymore.

Based on the afore described, the object of the invention is to further develop a liquid distribution device of the aforementioned kind in such a way that the afore described disadvantages of the prior art are overcome.

SUMMARY OF THE INVENTION

As a solution of this object, the invention proposes a liquid distribution device for fluid cooling devices particularly for cooling towers, comprising at least one primary distribution conduit in the form of a primary distribution pipe or a primary distribution trough, wherein a plurality of secondary distribution pipes are connected to the at least one primary distribution pipe or the at least one primary distribution trough, wherein the secondary distribution pipes are provided with nozzles, the liquid distribution device characterized in that the secondary distribution pipes comprise at least section-wise an angular cross-section, i.e., comprise at least one length section with an angular cross-section, and are made from a fiber reinforced plastic.

The liquid distribution device according to the invention is characterized by specially designed secondary distribution pipes. In contrast to the prior art, they are not formed with a round cross-section but at least sectionwise with an angular cross-section. The advantage of this angular configuration resides in the thus achieved flat contact of the new pipe contour on the rectangularly shaped supporting substructure beams of the water distribution piping. Also, a rectangular secondary distribution pipe imparts to the drift eliminators resting thereon a better linear load dissipation. In this way, according to the invention, bearing on the substructure beams as well as the load absorption from the supported droplet separators are made significantly more uniform and sagging of the secondary distribution pipes and of the drift eliminators is reduced or even entirely prevented.

This concept deliberately turns away from the general teaching of the prior art and the disadvantages of angular pipe cross-sections, in particular with regard to the flow behavior, are accepted. It has namely been surprisingly found that the pressure losses at the water side in quadrangular pipes do hardly surpass those in round pipes because the water distribution piping in cooling towers, based on experience, are designed only with minimal inner pipe speeds of 1 to maximally 2 m/s. For such moderate speeds, the pipe shape has only a subordinate effect on the pressure loss and on the uniformity of the water distribution within the entire water distribution system. The advantages that are achieved with the angular pipe configuration of the secondary distribution pipes according to the invention with regard to mechanical stability outweigh therefore the otherwise associated disadvantages.

An angular cross-section according to the invention refers to a substantially polygonal configuration of the cross-section. Particularly preferred is in this context a quadrangular and in particular preferred a rectangular configuration of the pipe cross-section. Angular in accordance with the invention refers in this context also to substantially angular configuration with rounded corners, in particular rounded inner corners. It has been found that rounded corners are particularly advantageous in particular with regard to an improved manufacturing quality and a homogenous tension distribution within the pipe. Preferably, the rounded corners in this context are embodied with a defined inner radius (r), for example, a radius of 2 mm-20 mm, preferably of 8 mm-17 mm, even more preferred of 15 mm, depending on the thickness of the wall. According to a preferred embodiment, the outer edges of the pipe are angled so that contact and/or support surfaces are formed that are positioned angularly relative to each other. On the inner side, these edges are rounded, for example, by reinforcement of the pipe wall in the transition area of the edges. In this way, a rounded inner configuration results, for example, with an inner radius of approximately 10 mm-20 mm. Alternatively, such a rounded corner configuration can also be provided with regard to the outer edge configuration. Important in accordance with the invention is that the cross-sectional configuration is substantially quadrangular which, according to the above disclosure, encompasses also that at least at the inner side rounded corners or edge courses at the corners are provided.

The use of distribution pipes with angular cross-section according to the invention in the liquid distribution device according to the invention is made possible only due to the special pipe material. This enables the manufacture of pipes with the required stability. According to the invention, for this purpose a fiber reinforced plastic such as in particular glass fiber reinforced plastic or carbon fiber reinforced plastic is employed. Particularly preferred is glass fiber reinforced plastic as a result of its excellent mechanical properties, its corrosion inability, and, simultaneously, its minimal weight. Pipes of normal plastic material or a light metal such as particularly aluminum, due to their lack of mechanical stiffness, in particular in the longitudinal direction of the pipe, must be produced with such a great wall thickness that, in view of economical aspects, it is not feasible to manufacture them with an angular cross-sectional configuration. The at least section-wise angular cross-section of the pipes and the employed fiber composite material lead thus in a synergetic way to a significantly increased stiffness that enables significantly greater support widths of the substructure beams without the wall thickness having to be increased in a cost-incurring way.

As a whole, significantly greater spanning widths for the substructure beams of the liquid distribution device are thus enabled or, in case of small cooling towers, can even be entirely omitted so that material expenditure and assembly expenditure are reduced in a significant way. With fewer substructure beams, the air-side pressure loss in the cooling tower is moreover reduced and the spray distribution of the water above the cooling inserts is improved.

Moreover, the configuration according to the invention of the secondary distribution pipes advantageously enables walking across for assembly purposes and for maintenance purposes as an alternative. To assist this, planks can also be placed onto the now flat surfaces of these more stable pipes which can carry the additional load of persons without a problem.

According to a preferred embodiment of the invention, the at least one primary distribution pipe also has an angular cross-section at least section-wise, i.e., comprises at least one length section with an angular cross-section. Accordingly, an increased stiffness and stability of the primary distribution pipe and thus of the entire liquid distribution device can advantageously be achieved also, without increasing in a cost-incurring way the wall thickness of the primary distribution pipe.

Mounting and demounting in case of maintenance work of the liquid distribution device according to the invention are further simplified in accordance with a preferred embodiment of the invention by simple plug systems by means of pipe couplings and sleeves so that the maintenance expenditure associated therewith is reduced.

According to further preferred feature of the invention, the secondary distribution pipes and/or the at least one primary distribution pipe across their entire effective length extension have an angular cross-section. In this way, advantageously, the total stability of the angularly designed pipes and thus of the entire liquid distribution device is improved. Moreover, the manufacture, execution of connections, and assembly are further simplified because the respective component is produced in only one uniform cross-sectional shape.

According to a preferred feature of the invention, the secondary distribution pipes and/or the at least one primary distribution pipe are embodied as quadrangular pipes. In this way, the pipes advantageously provide a maximum horizontal contact surface for the substructure and/or the drift eliminators which further increases the mechanical stability of the liquid distribution device. Moreover, walking across the pipes in case of servicing and installation work can be facilitated in an advantageous way by the configuration of a maximally walkable horizontal surface.

According to a particularly preferred feature of the invention, the secondary distribution pipes are formed of at least two pipe parts that are connectable to each other. Preferably, the pipe parts are connectable to each other by a plug connection. For this purpose, preferably a rectangular connecting element which is formed in particular as a sleeve is provided. For reasons of stability, the sleeve is preferably formed of a fiber reinforced plastic. This preferred embodiment enables the simple and mechanically stable connection of the secondary distribution pipes and enables thus the adaptation of the liquid distribution device to any desired liquid distribution surface.

According to a further feature of the invention, the secondary distribution pipes and/or primary distribution pipes, embodied according to the invention preferably as quadrangular pipes, are advantageously integrated into a support structure of a liquid cooling device and/or of a cooling tower. The support structure of a fluid cooling device and/or of a cooling tower is generally at least section-wise formed of a fiber reinforced plastic, for example, a glass fiber reinforced plastic.

In this case, the quadrangular pipes that according to the invention are also formed from a fiber reinforced plastic, preferably a glass fiber reinforced plastic, and serve as secondary distribution pipes can be integrated into the support structure of the fluid cooling device and/or of the cooling tower and insofar can also take on supporting functions. This provides in an advantageous way savings in regard to the support construction because the quadrangular pipes used according to the invention not only serve for liquid distribution but also, as a component of the support construction, serve for providing a supporting action. In this way, it is in particular possible, in contrast to prior art constructions, to eliminate a complete cross member layer at the level of the fluid distribution pipes because the quadrangular pipes according to the invention not only serve for fluid distribution but also for reinforcement of the support structure at this level.

BRIEF DESCRIPTION OF THE DRAWINGS

Further features and advantages of the invention result from the following description with the aid of the figures. It is shown in.

PREFERRED EMBODIMENTS

Figure 1:
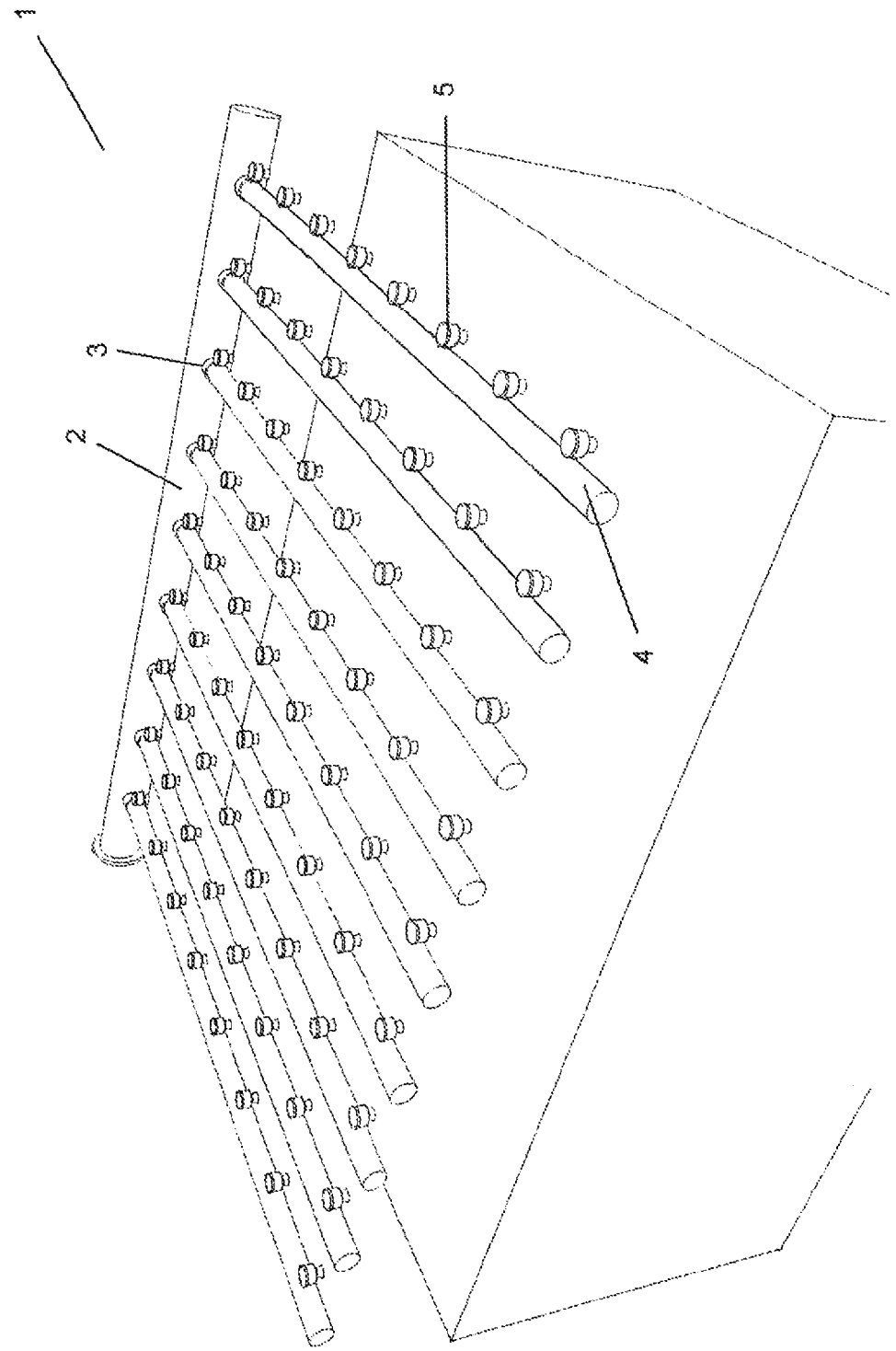
FIG. 1 a configuration known from the prior art of a liquid distribution device in schematic perspective illustration.

FIG. 1 shows a liquid distribution device 1 that is known from the prior art, comprising a primary distribution pipe 2. The primary distribution pipe 2 has a round cross-section and comprises round cutouts 3 for connection with the secondary distribution pipes 4. The secondary distribution pipes have also a round cross-section and are provided with tangentially attached nozzles 5.

Figure 2:
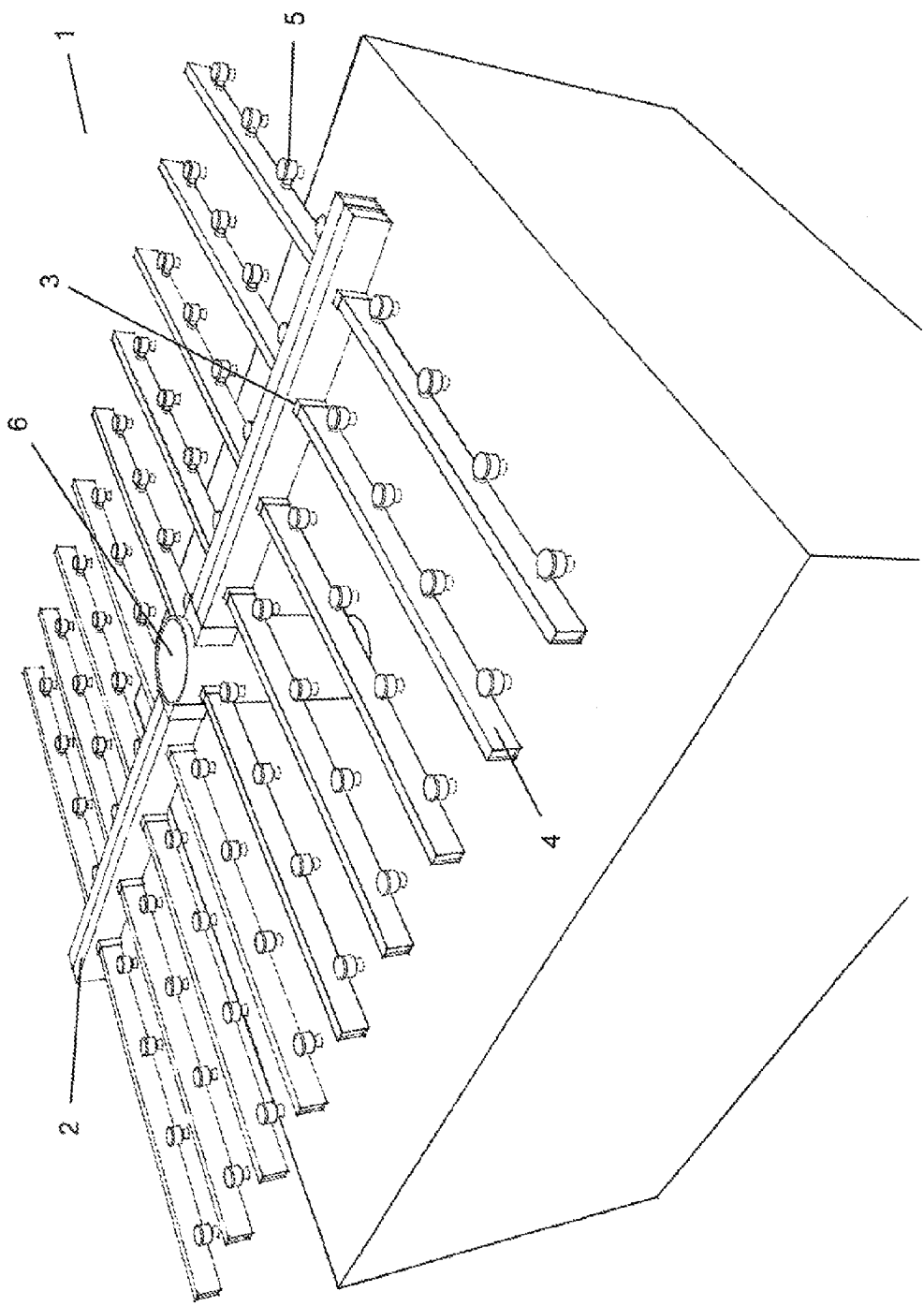
FIG. 2 a first embodiment according to the invention of the liquid distribution device in schematic perspective illustration.
Figure 3:
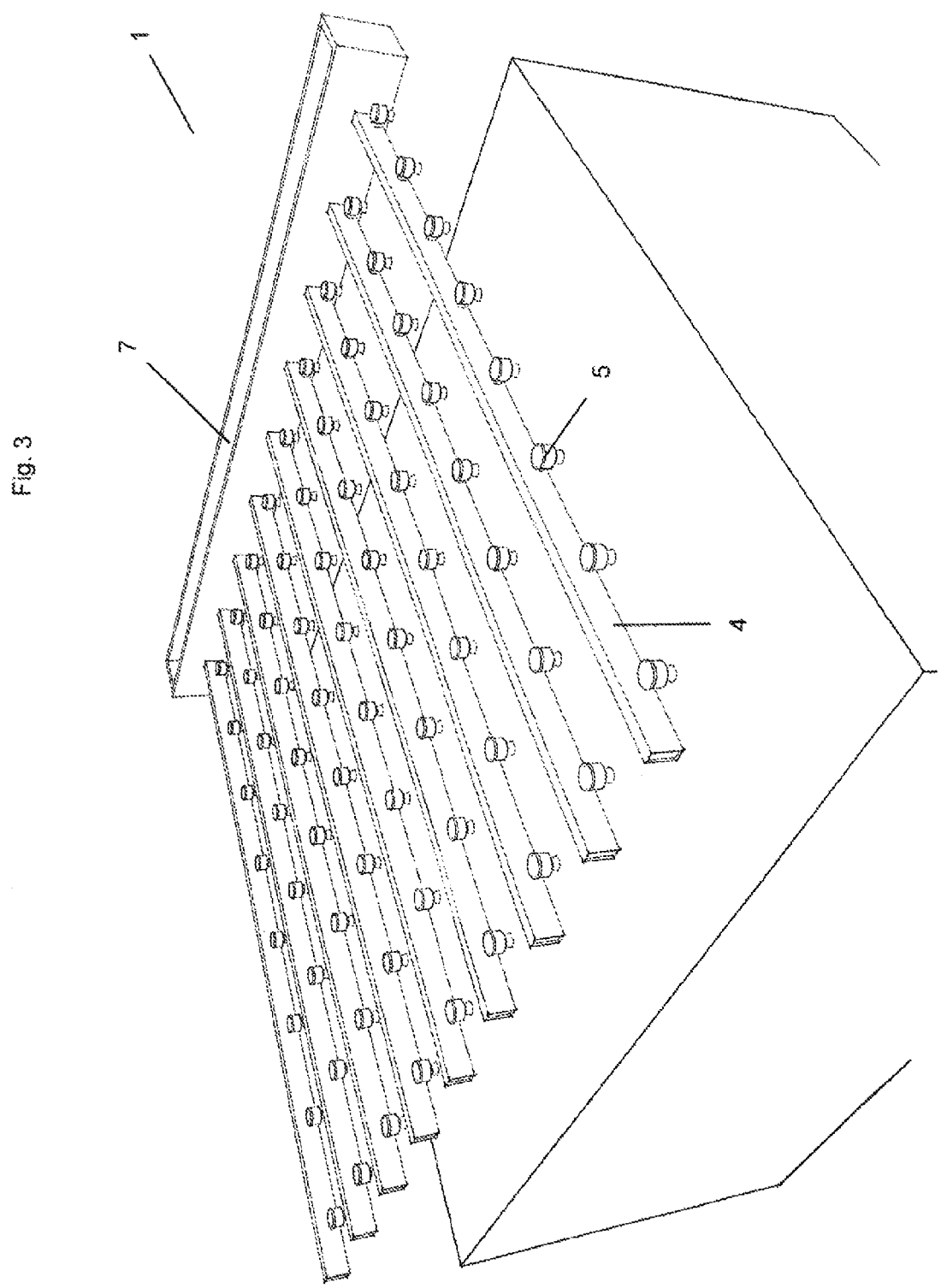
FIG. 3 a second embodiment according to the invention of the liquid distribution device in schematic perspective illustration.
Figure 4:
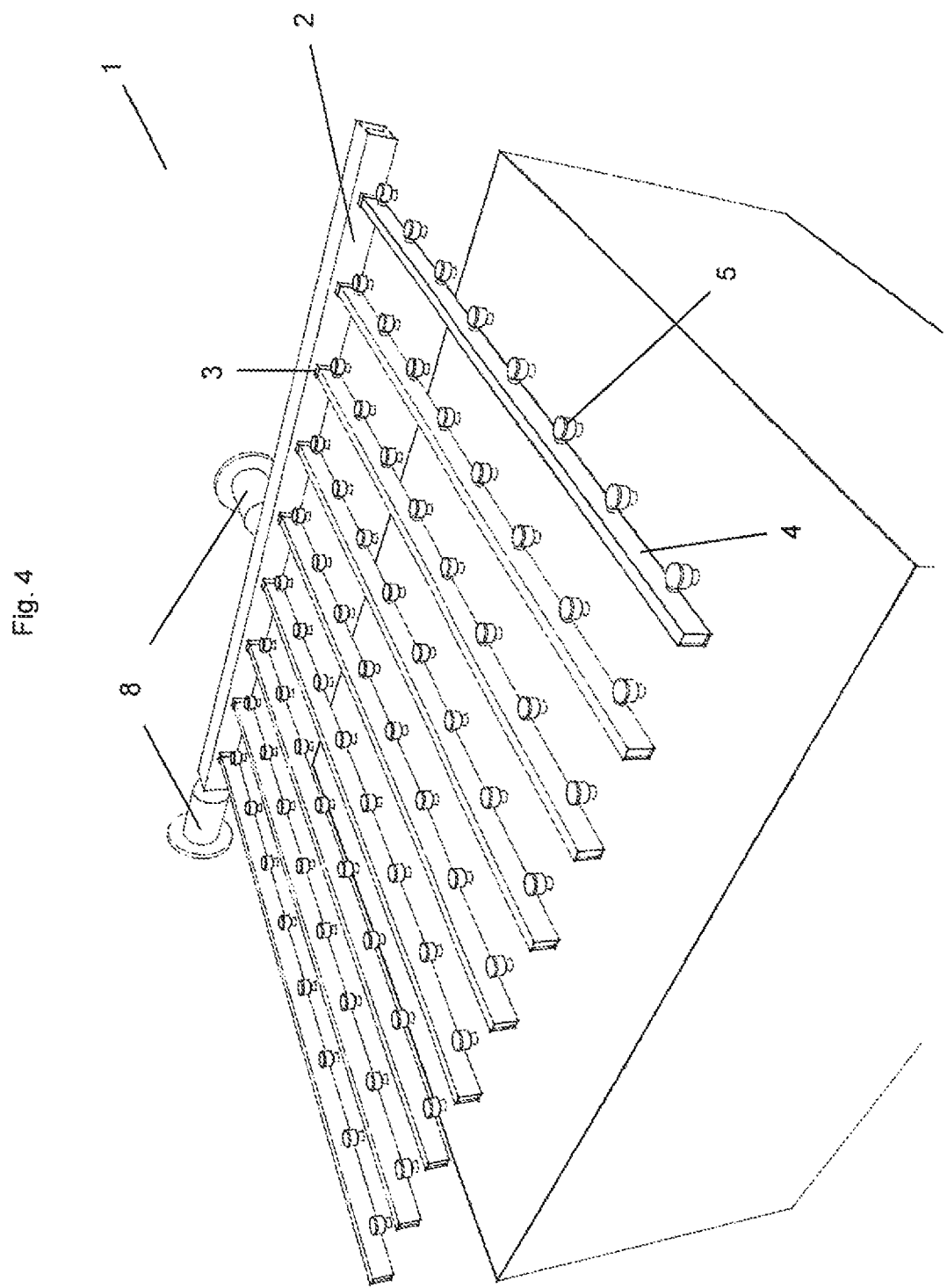
FIG. 4 a third embodiment according to the invention of the liquid distribution device in schematic perspective illustration.

The FIGS. 2 to 4 show embodiments of liquid distribution devices according to the invention.

FIG. 2 shows in this context a first embodiment of the liquid distribution device 1 comprising a riser pipe 6 and two primary distribution pipes 2. The primary distribution pipes 2 are produced in this context from glass fiber reinforced plastic and have a rectangular cross-section. The primary distribution pipes 2 have moreover rectangular cutouts 3 for a simple plug connection with the secondary distribution pipes 4. The secondary distribution pipes 4 are also manufactured from glass fiber reinforced plastic and have a rectangular cross-section. In this context, they are arranged parallel to each other and oriented at a right angle to the primary distribution pipes and equidistantly spaced apart from each other. Moreover, the secondary distribution pipes comprise tangentially attached nozzles 5 which in the present example are designed as full cone nozzles.

FIG. 3 shows a second embodiment of the liquid distribution device 1 with a primary distribution trough 7. The primary distribution trough 7 in this context is made of concrete and has a rectangular cross-section. Moreover, the primary distribution trough has rectangular cutouts 3 for a simple plug connection with the secondary distribution pipes 4. The secondary distribution pipes 4 are manufactured of glass fiber reinforced plastic and have a rectangular cross-section. In this context, they are arranged parallel to each other and oriented at a right angle to the primary distribution trough and equidistantly spaced apart from each other. Moreover, the secondary distribution pipes comprise tangentially attached nozzles 5 which are designed as full cone nozzles in the present example. The embodiment illustrated in FIG. 3 describes in an exemplary fashion an already existing cooling tower with a retrofitted liquid distribution device according to the invention.

FIG. 4 shows a third embodiment of the liquid distribution device 1 with two possible positions for a connecting flange 8 and a primary distribution pipe 2. The primary distribution pipe 2 is manufactured in this context of glass fiber reinforced plastic and has a rectangular cross-section. The primary distribution pipe 2 comprises moreover rectangular cutouts 3 for a simple plug connection with the secondary distribution pipes 4. The secondary distribution pipes 4 are also manufactured of glass fiber reinforced plastic and have a rectangular cross-section. In this context, they are arranged parallel to each other and oriented at a right angle to the primary distribution pipe 2 and equidistantly spaced apart from each other. Moreover, the secondary distribution pipes comprise tangentially attached nozzles 5 which in the present example are designed as full cone nozzles.

Figure 5:
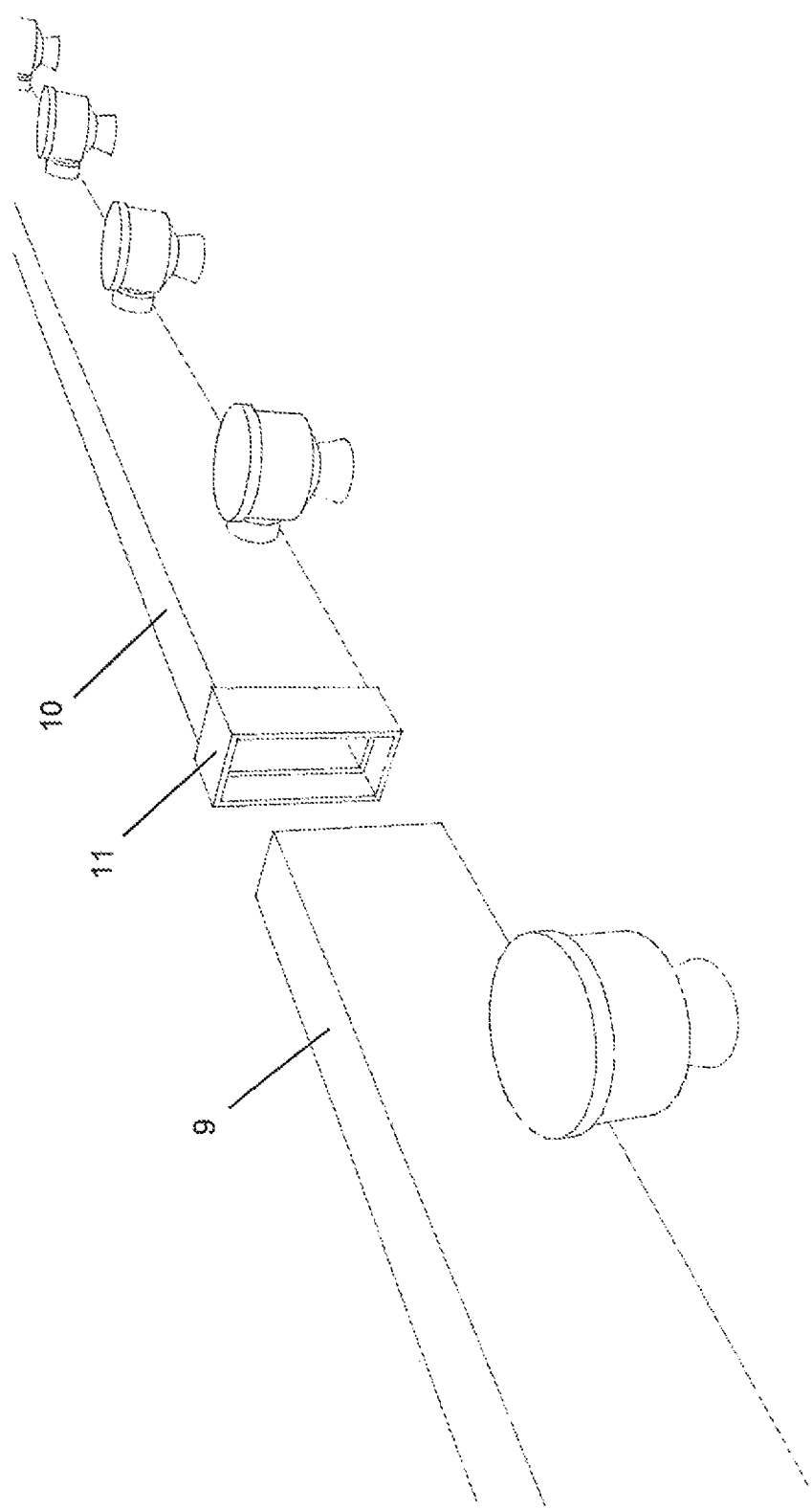
FIG. 5 a preferred embodiment of the secondary distribution pipes in schematic perspective illustration.

FIG. 5 illustrates connecting two secondary distribution pipe segments 9, 10 to a secondary distribution pipe 4 by means of a sleeve 11. The sleeve 11 has for this purpose a rectangular cross-section and is formed with a greater circumference than the secondary distribution pipes 4. The secondary distribution pipe segments 9, 10 can thus be inserted in a simple way into the sleeve 11. In the present case, the sleeve 11 is formed from glass fiber reinforced plastic. The embodiment according to the invention enables the simple and mechanically stable connection of the secondary distribution pipe segments 9, 10 and enables thus the adaptation of the liquid distribution device to any desired liquid distribution surface. In particular the combination of angular secondary distribution pipe segments 9, 10 and of an angular sleeve 11 provides moreover the advantage of the inherent anti-rotation connection of the secondary distribution pipe segments 9, 10.

Figure 6:
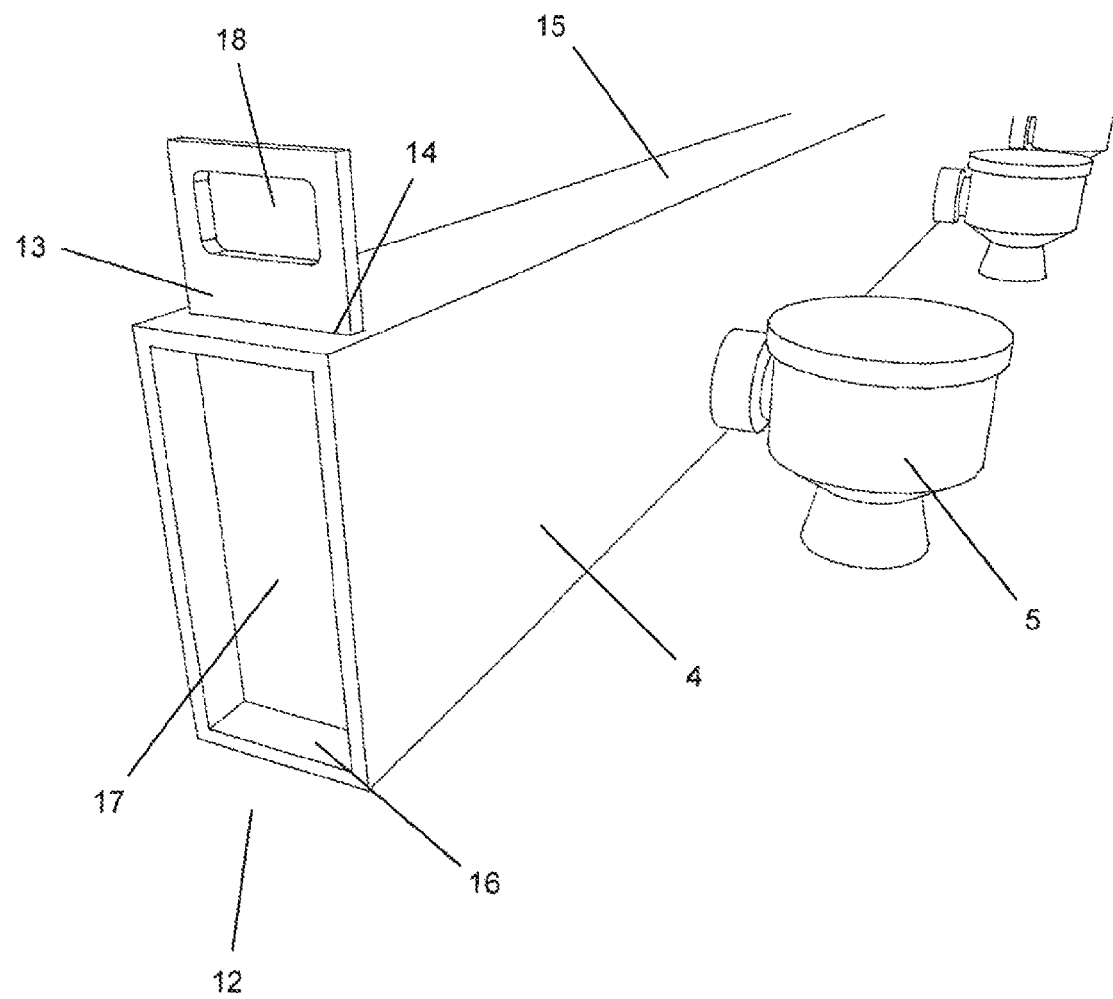
FIG. 6 a further preferred embodiment of the secondary distribution pipes in schematic perspective illustration.

FIG. 6 shows a detail view of a secondary distribution pipe 4 with full cone nozzles 5. The end 12 facing away from the primary distribution pipe 2 (not shown here) of the secondary distribution pipe 4 carries a closure cap 13. The closure cap 13 extends through a slot 14 in the upper wall 15 of the secondary distribution pipe 4 to the bottom wall 16 of the secondary distribution pipe 4 and thus closes off the opening 17 at the end face of the secondary distribution pipe 4. Due to the closure of the opening 17 at the end face, a reduction of the inner pressure is effectively avoided and the function of the nozzles 5 is ensured. It is possible in this context to remove the closure cap, in particular for cleaning and maintenance work, by simply pulling it out of the slot 14. For this purpose, the closure cap 13 is provided with a cutout 18 for handling by the user. The expenditure associated with such cleaning and maintenance work is reduced with the embodiment according to the invention. The use of such a closure cap according to the invention is possible in this context only by the use of angular pipe cross-sections because for a round pipe the slot 14 required for this purpose would have to be designed to be significantly longer, i.e., comprise at least half the circumference of the round pipe cross-section, in order to ensure complete coverage of the opening at the end face of the pipe. The constructive stability of the round pipe is reduced in this way such that a pressure-caused tearing off of the pipe end cannot be prevented.

Figure 7:
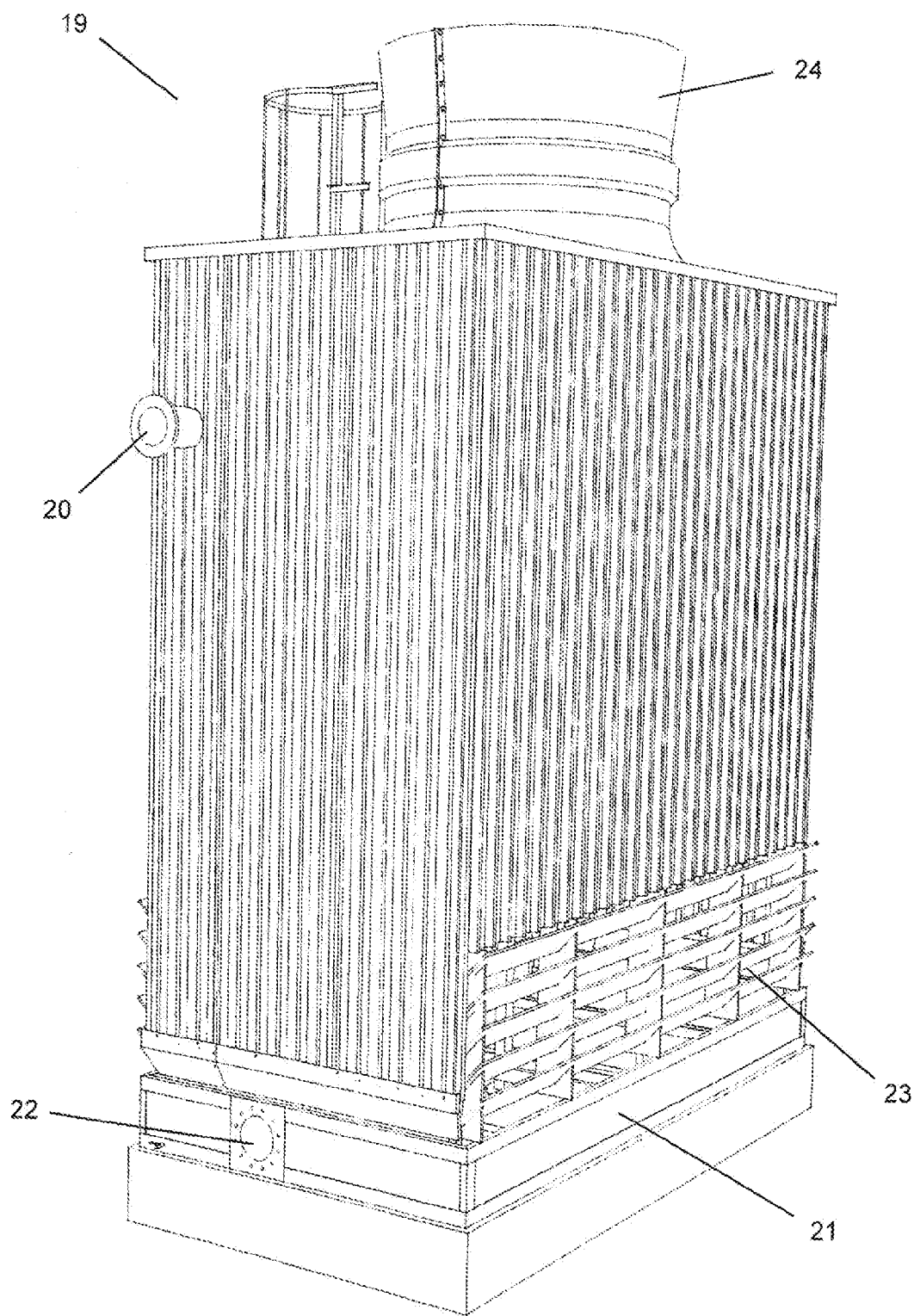
FIG. 7 a cooling tower known from the prior art in schematic perspective illustration.

FIG. 7 shows an exterior view of a cooling tower 19 known form the prior art. The cooling tower 19 comprises a liquid infeed 20 for connecting to a liquid distribution device 1. The liquid which is distributed by means of the liquid distribution device 1 for the purpose of cooling is guided past an air stream, is collected within the liquid basin 21, and is then supplied to its proper location of use by means of the liquid drain 22. For generating the air stream for cooling, the cooling tower 19 comprises air inlets 23 below the liquid distribution device 1. The exit of the cooling air is realized via the housing 24 which is designed in the form of a diffusor and houses the air outlet and a fan 25.

Figure 8:
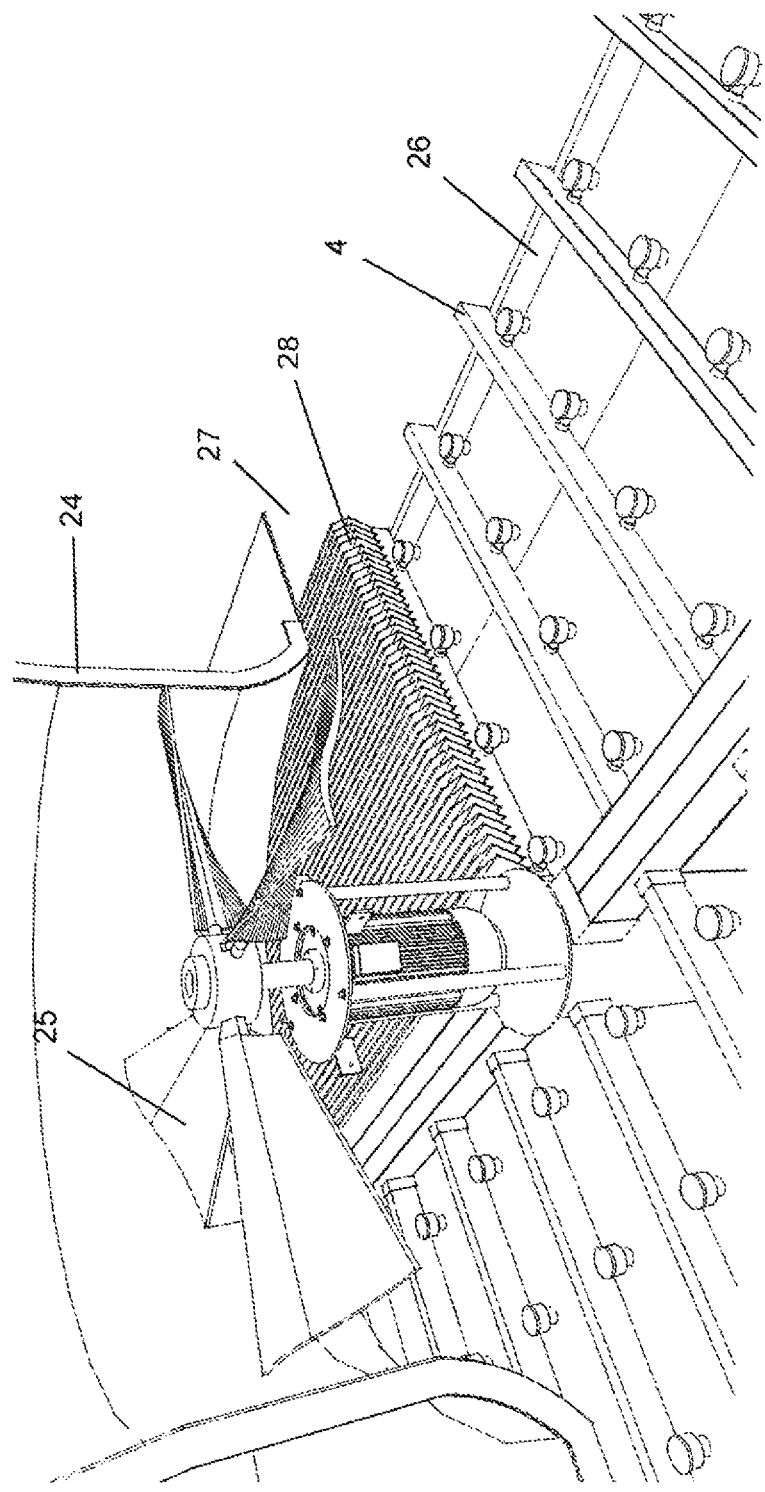
FIG. 8 cooling tower according to FIG. 7 with the embodiment according to the invention in accordance with FIG. 2 in schematic perspective illustration.

FIG. 8 shows a detail of the interior of the cooling tower 19 with a liquid distribution device 1 according to FIG. 2. The rectangular secondary distribution pipes 4 are in the present case supported by the transverse beams 26 that are also rectangular. It is apparent that the contact surface of the secondary distribution pipes 4 on the transverse beams 26 is significantly larger than would be the case for round secondary distribution pipes resting only linearly on the transverse beams 26. The force absorption of the transverse beam 26 is thus significantly improved and a deformation of the pipes is effectively prevented. The secondary distribution pipes 4 support in turn the drift eliminator 27 which is comprised of a plurality of baffles 28. Here also the contact surface between secondary distribution pipe 4 and baffle 28 is significantly increased by the rectangular configuration of the secondary distribution pipes 4. The force absorption of the secondary distribution pipe 4 is significantly improved by the increased contact surface and a deformation of the baffles 28 is in this way reduced or entirely prevented.

LIST OF REFERENCE NUMERALS 1 liquid distribution device
2 primary distribution pipe
3 cutout
4 secondary distribution pipe
5 nozzle
6 riser pipe
7 primary distribution trough
8 connecting flange
9 secondary distribution pipe segment
10 secondary distribution pipe segment
11 sleeve
12 end of secondary distribution pipe 4
13 closure cap
14 slot
15 upper wall of secondary distribution pipe 4
16 bottom wall of secondary distribution pipe 4
17 opening at the end face of the secondary distribution pipe 4
18 cutout
19 cooling tower
20 liquid infeed
21 liquid basin
22 liquid drain
23 air inlets
24 housing
25 fan
26 transverse beam
27 drift eliminator
28 baffle

What is claimed is:

1. A fluid cooling device comprising a liquid distribution device, the liquid distribution device comprising:
at least one primary distribution conduit selected from the group consisting of a primary distribution pipe and a primary distribution trough;
secondary distribution pipes connected to the at least one primary distribution conduit;
nozzles attached to the secondary distribution pipes;
the secondary distribution pipes comprising at least one length section provided with an angular cross-section; and
the secondary distribution pipes formed from a fiber reinforced plastic.

2. The fluid cooling device according to claim 1, wherein the at least one primary distribution conduit is a primary distribution pipe comprising at least one length section provided with an angular cross-section.

3. The fluid cooling device according to claim 2, wherein the primary distribution pipe is formed from a fiber reinforced plastic.

4. The fluid cooling device according to claim 3, wherein the fiber reinforced plastic of the primary distribution pipe is a glass fiber reinforced plastic (GRP).

5. The fluid cooling device according to claim 2, wherein the primary distribution pipe is provided with a rectangular cross-section across its entire length extension.

6. The fluid cooling device according to claim 2, wherein the primary distribution pipe is a quadrangular pipe.

7. The fluid cooling device according to claim 6, wherein the secondary distribution pipes are quadrangular pipes.

8. The fluid cooling device according to claim 1, wherein the fiber reinforced plastic is a glass fiber reinforced plastic (GRP).

9. The fluid cooling device according to claim 1, wherein the secondary distribution pipes are provided with a rectangular cross-section across an entire length extension thereof.

10. The fluid cooling device according to claim 1, wherein the secondary distribution pipes are quadrangular pipes.

* * * * *